(12) United States Patent
Jain et al.

(10) Patent No.: US 10,416,855 B2
(45) Date of Patent: Sep. 17, 2019

(54) INTEGRATING REMOTE ASSETS FROM CONTENT MANAGEMENT SERVICE WITH CONTENT DEVELOPED BY CONTENT CREATION APPLICATIONS

(71) Applicant: Adobe Inc., San Jose, CA (US)

(72) Inventors: Sanyam Jain, Delhi (IN); Pragya Kandari, Uttarakhand (IN); Manohar Singh Gour, Rajasthan (IN); Abhishek Raj, Jharkhand (IN); Ramnik Singh, Uttar Pradesh (IN); Abhinav Kumar Agarwal, Uttar Pradesh (IN); Gaurav Bhargava, Uttar Pradesh (IN); Nitin Kumar, Uttar Pradesh (IN); Anshul Jain, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/810,346

(22) Filed: Nov. 13, 2017

(65) Prior Publication Data

US 2019/0146644 A1    May 16, 2019

(51) Int. Cl.
*G06F 3/0484* (2013.01)
*H04L 29/08* (2006.01)
*G06F 16/93* (2019.01)
*G06F 17/22* (2006.01)
*H04L 29/06* (2006.01)

(52) U.S. Cl.
CPC ............ *G06F 3/0484* (2013.01); *G06F 16/93* (2019.01); *H04L 67/1097* (2013.01); *H04L 67/141* (2013.01); *G06F 17/2235* (2013.01); *H04L 67/42* (2013.01)

(58) Field of Classification Search
CPC ..................................................... G06F 3/0484
USPC ........................................................ 715/738
See application file for complete search history.

(56) References Cited

U.S. PATENT DOCUMENTS

| 8,732,607 | B1 * | 5/2014 | Grechishkin | G06F 9/45558 |
| | | | | 715/781 |
| 8,799,829 | B2 * | 8/2014 | Grosz | G06F 3/1242 |
| | | | | 715/866 |
| 10,079,959 | B2 * | 9/2018 | Prenn | G06K 15/1851 |
| 2009/0150791 | A1 * | 6/2009 | Garcia | G06F 17/30873 |
| | | | | 715/738 |

(Continued)

*Primary Examiner* — William D Titcomb
(74) *Attorney, Agent, or Firm* — Kilpatrick Townsend & Stockton LLP

(57) ABSTRACT

In some embodiments, an asset integration service establishes a communication session between a design application and a client device for accessing source graphical assets from a web server executing a content management service. The integration service receives, during the communication session and via a design interface from the design application, a request to add a source graphical asset to a document displayed on the client device. The integration service retrieves, responsive to the request, a placement graphical asset that is a lower-resolution copy of the source graphical asset and updates the design interface to include the placement graphical asset. The integration service associates the placement graphical asset with a network link for accessing the source graphical asset via the content management service. The integration service subsequently detects that the source graphical asset has been changed and displays, via the design interface, a notification that the placement graphical asset is outdated.

20 Claims, 8 Drawing Sheets

(56) References Cited

U.S. PATENT DOCUMENTS

| | | | | |
|---|---|---|---|---|
| 2011/0225500 | A1* | 9/2011 | Casalaina | G06F 17/30528 715/738 |
| 2013/0005369 | A1* | 1/2013 | Bocking | H04M 1/27455 455/466 |
| 2013/0086466 | A1* | 4/2013 | Levy | G06F 21/10 715/234 |
| 2013/0239009 | A1* | 9/2013 | DeGrazia | G06F 3/0481 715/738 |
| 2013/0297535 | A1* | 11/2013 | Joshi | G06F 3/0484 705/400 |
| 2013/0339867 | A1* | 12/2013 | Kembel | G06F 17/30899 715/738 |
| 2014/0075324 | A1* | 3/2014 | Howard | H04L 12/18 715/738 |
| 2014/0195921 | A1* | 7/2014 | Grosz | G06F 3/1242 715/738 |
| 2014/0331143 | A1* | 11/2014 | Herold | G06Q 10/107 715/738 |
| 2014/0365319 | A1* | 12/2014 | Huang | G06F 3/0484 705/14.73 |
| 2016/0041957 | A1* | 2/2016 | Finsterwald | G06F 3/0484 715/202 |
| 2016/0154539 | A1* | 6/2016 | Buddhiraja | G06F 9/45558 715/738 |

* cited by examiner

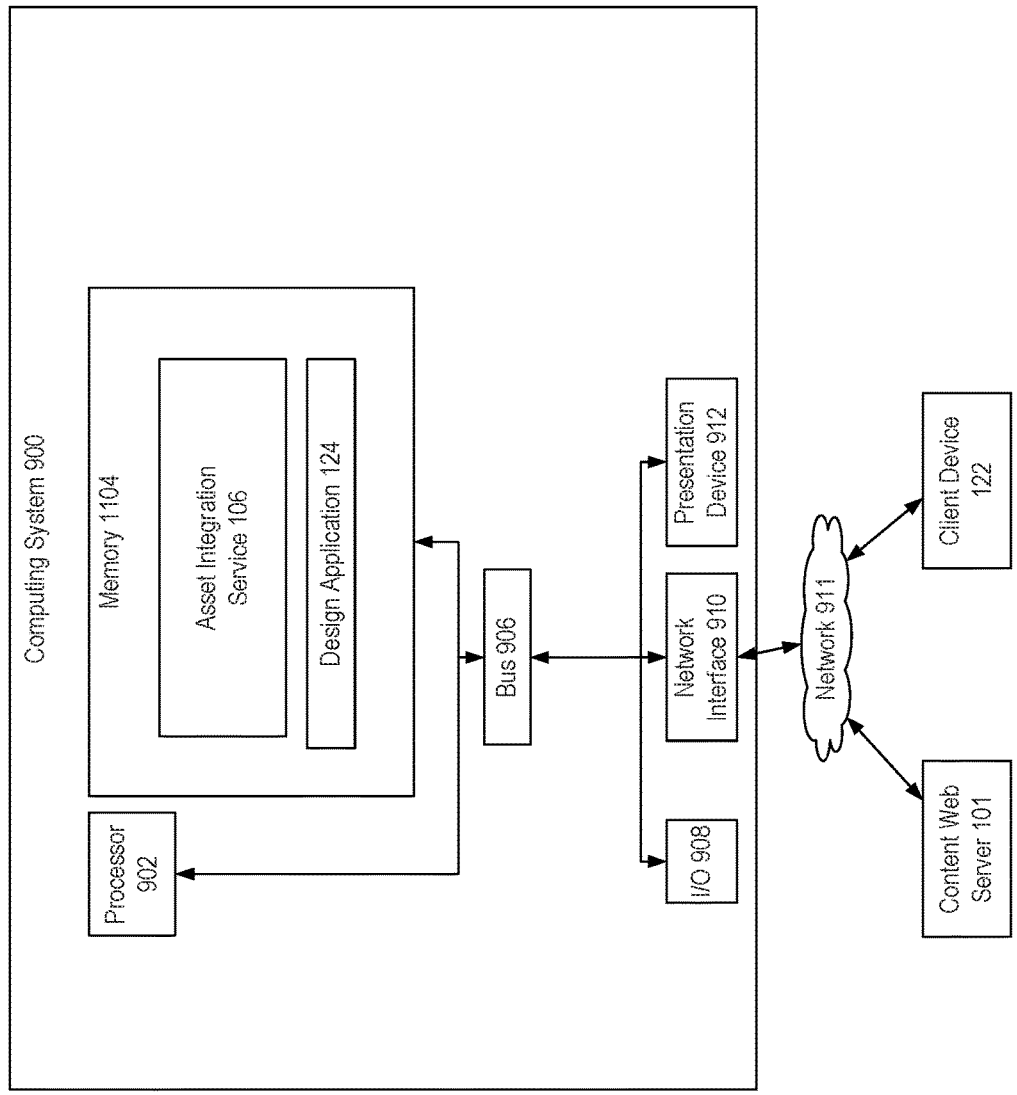

INTEGRATING REMOTE ASSETS FROM CONTENT MANAGEMENT SERVICE WITH CONTENT DEVELOPED BY CONTENT CREATION APPLICATIONS

TECHNICAL FIELD

This disclosure relates generally to processing data using distributed computing systems to coordinate the generation of presentation data for one or more electronic documents. More specifically, but not by way of limitation, this disclosure relates to integrating remote assets from one or more content management services with content that is developed by design applications or other content creation applications.

BACKGROUND

Design applications and other content creation applications are used for generating creative content. For instance, a design application could be used to create a layout of images and text for a brochure. To generate this creative content, a design application accesses assets (e.g., images, videos, graphics, etc.) from various data sources. These data sources include local or remote file systems used as asset repositories, using mounted drives that are mapped to online content services, etc.

Using local or remote file systems as an asset repository involves, for example, saving assets to the local drives. The saved assets are linked to local storage, shared via a shared server, embedded into a document, etc. These processes increase document size or otherwise utilize memory resources of file systems. This memory utilization can strain available resources if assets are particularly large (e.g., many megabytes or even gigabytes in size).

SUMMARY

Certain embodiments integrating remote assets from one or more content management services with content that is developed by design applications or other content creation applications. For example, an asset integration service establishes a communication session between a design application and a client device for accessing source graphical assets from a content web server that executes a content management service. The asset integration service receives, during the communication session and via a design interface from the design application, a request to add a source graphical asset to a document displayed on the client device. The asset integration service retrieves, responsive to the request, a placement graphical asset that is a lower-resolution copy of the source graphical asset and updates the design interface to include the placement graphical asset. The asset integration service associates the placement graphical asset with a network link for accessing the source graphical asset via the content management service. The asset integration service subsequently detects that the source graphical asset has been changed and displays, via the design interface, a notification that the placement graphical asset is outdated.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 9 depicts an example of a computing system that executes an asset integration service for integrating remote assets from one or more content management services with content developed by one or more design applications, according to certain embodiments of this disclosure.

DETAILED DESCRIPTION

Figure 1:
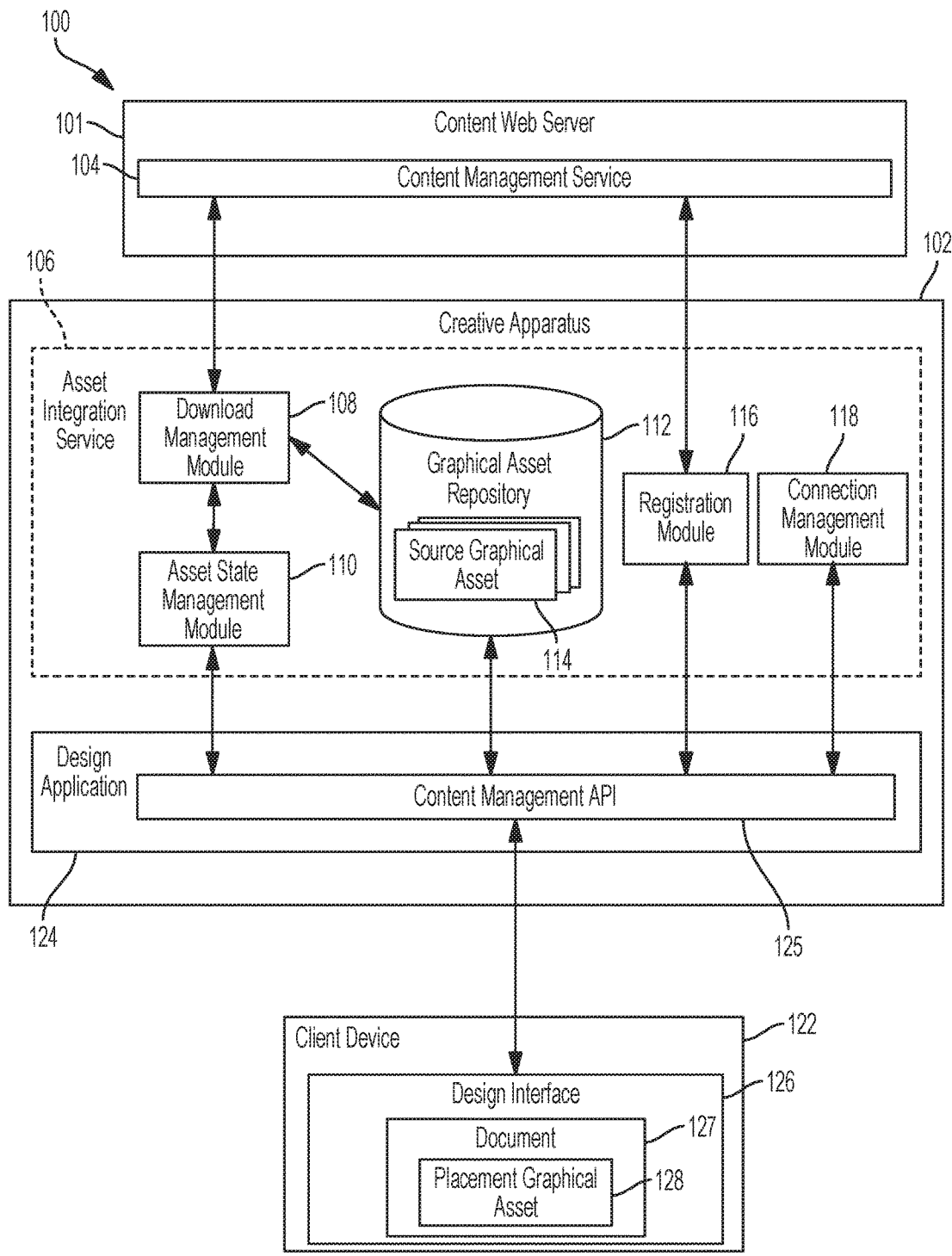
FIG. 1 depicts an example of an operating environment for integrating remote assets from one or more content management services with content developed by one or more design applications, according to certain embodiments of this disclosure.

This disclosure involves integrating remote assets from content management services with content developed by design applications or other content creation applications. Examples of design applications include Adobe® Photoshop, Adobe® Illustrator, and Adobe® InDesign. A design application integrates remote assets with content in a local document via communications with a remote content management service, such as (but not limited to) Adobe Experience Manager ("AEM")®. For instance, the content creation application uses a network-based linking, in which a uniform resource locator ("URL") points to the location of a source graphical asset on the content management service, to track changes to the source graphical asset and notify the user of those changes. Additional embodiments include refreshing the low-resolution version of the asset following the notification as well as on-demand downloads, such as downloading the full-resolution version of the asset when the local document is exported (e.g., to a PDF file) or downloading the full-resolution version in response to a command from a user. These embodiments allow a design application to develop creative content using up-to-date versions of large assets hosted on cloud-based content management services, while decreasing the resources (i.e., network bandwidth, memory storage, etc.) that would otherwise be required for storing local copies of any assets being used.

The follow non-limiting example is intended to introduce certain embodiments. In this example, a design application is used to generate creative content, such as a brochure having a collection of images, graphics, and text. The design application communicates with an asset integration service, which provides access to graphical assets hosted by one or more remote content management services. An example of a graphical asset is a high-resolution image or graphic that a designer wishes to include in a brochure. The design application provides, via a design interface, a user with a listing of assets that are available from content management services. If the design application receives a selection of one of these assets, such as a high-resolution image, the design application causes the asset integration service to generate or retrieve a placement graphical asset, which is a low-resolution version of the selected image. The low-resolution version of the selected image has the same dimensions as the selected high-resolution image.

Continuing with this example, the asset integration service provides the placement graphical asset to the design application. Since the placement graphical asset has the same dimensions as the source graphical asset hosted by the content management service, the placement graphical asset can be used by the designer to arrange a layout of creative content. Furthermore, since the placement graphical asset has a lower resolution (and therefore a smaller file size) as compared to the source graphical asset, the placement graphical asset can be stored on a designer's computing device (e.g., a tablet computer) without utilizing excessive network bandwidth, memory capacity, etc.

The asset integration service can also monitor a status of the selected asset by communicating with the content management service that hosts the asset. If the asset integration service detects that the source graphical asset has been changed after the placement graphical asset has been retrieved, the asset integration service causes the design application to display a notification that the placement graphical asset is outdated. This provides a designer with the option of obtaining an updated version of the placement graphical asset that corresponds to the updated version of the source graphical asset.

As used herein, the term "creative content" is used to refer to a document or group of documents intended to be presented together and having a group of graphical assets arranged in one or more layouts.

As used herein, the term "graphical asset" is used to refer to a content item having at least some data to be displayed or otherwise presented to an end user within one or more documents that include creative content. Examples of an asset include an image, a drawing, a video, text, etc.

As used herein, the term "placement graphical asset" is used to refer to a copy of a source graphical asset in which the copy has the same dimensions as the source graphical asset and a reduced resolution as compared to the source graphical asset.

As used herein, the term "on-demand download" is used to refer to replacing a placement graphical asset with a corresponding source graphical assessment into an output document that includes creative content.

Examples of an Operating Environment for Integrating Remote Assets from Content Management Services with Content that is Developed by Design Applications Turning now to the drawings, FIG. 1 depicts an example of an operating environment 100 for integrating remote assets from one or more content management services 104 with content developed by one or more design applications 124. In this example, the operating environment 100 includes a creative apparatus 102 that is communicatively coupled to one or more content web servers 101 and one or more client devices 122 via one or more data networks. A content web server 101 executes program code that includes one or more content management services 104. The creative apparatus 102 executes program code that includes an asset integration service 106 and one or more design applications 124.

A content management service 104 is an online platform for creating, storing, sharing, and otherwise using graphical assets. The content management service 104 can be used for building online interactive content (e.g., websites, mobile applications, forms, etc.). The content management service 104 is accessible by one or more user devices without using a design application or an asset integration service 106. These user devices can create, modify, or otherwise provide graphical assets to the creative apparatus 102 via the content management service. The provided graphical assets are accessible to users of creative applications via the asset integration service 106.

The asset integration service 106 performs one or more operations for providing access to assets, which are available from the content management service 104, to workflows of design applications. For example, the asset integration service 106 can provide a common point of interface between multiple design applications and multiple content management services. These connections allow a given design application to create, manage, and deliver digital experiences across websites, mobile sites, and on-site screens using graphical assets that are relevant and engaging. Examples of the integration operations are described herein with respect to FIGS. 2-8.

In the example depicted in FIG. 1, the client device 122 executes program code, such as a browser application or other client application, that accesses the design application 124 from a cloud-based service hosted by the creative apparatus 102. The browser application or other client application presents a design interface 126, which is provided by the design application 124, as the client device 122. The design interface 126 is used to edit a document 127 on the client device 122. In alternative embodiments, the design application 124 can include software that is persistently stored on the client device 122, software that is temporarily stored on the client device 122 when a session is established with one or more cloud-based services hosted by the creative apparatus 102, or some combination thereof.

The client device 122 can communicate with the asset integration service 106 using a suitable application programming interface ("API"), such as a content management API 125 of the design application 124. To access these modules via the content management API 125, the client device 122 receives user commands via design interface 126. In some embodiments, the user commands cause the client device 122 to transmit various function calls that are formatted in accordance with the content management API 125. The design application 124 routes these function calls to various modules of the asset integration service 106 via the content management API 125. In other embodiments, the client device 122 transmits the user commands to the design application 124, which responds to receiving the user commands by creating suitable function calls in accordance with the content management API 125 and routing these function calls to various modules of the asset integration service 106.

The asset integration service 106 includes modules such as a download management module 108, an asset state management module 110, a registration module 116, and a connection management module 118. The asset integration service 106 also includes a graphical asset repository 112.

The download management module 108 is a module of the asset integration service 106 that downloads copies of assets available from one or more content management services 104. The download management module 108, which can be a pluggable module, communicates with one or more content management services 104. The download management module 108 thereby acts as an interface between the graphical asset repository 112 and one or more content management services 104. The download management module 108 provides asset download capability by retrieving source graphical assets 114, corresponding placement graphical assets 128, or both from one or more content management services 104 and storing these assets in the graphical asset repository 112. The download management module 108 also monitors the progress of various scheduled downloads.

The asset state management module 110 is a module of the asset integration service 106 that monitors the state of source graphical assets 114 hosted by content management services 104, thereby supporting creative workflows. For example, the asset state management module 110 monitors the status of a source graphical asset available from a content management service. If the asset state management module 110 detects a change in the status (i.e., a modification to the asset, a removal of the asset, etc.), the asset state management module 110 provides a notification to the design application 124 that a placement graphical asset 128 used in a particular workflow no longer matches a corresponding source graphical asset. In some embodiments, the asset status management is performed asynchronously, where the asset state management module 110 creates a batch of asset state requests for various placement graphical assets 128 used in the document 127 and transmits the batch of asset state requests to one or more content management services 104 via the download management module 108. Examples of operations performed by the asset state management module 110 are described in greater detail herein with respect to FIGS. 2 and 3.

The graphical asset repository 112 is a temporary store for various graphical assets available from one or more content management services 104. Using the graphical asset repository 112 as a temporary store can increase the speed at which a particular client device 122 can access the graphical assets available from the content management services 104. In some embodiments, the graphical asset repository 112 stores source graphical assets 114, which are full-resolution copies of graphical assets available from one or more content management services 104. In additional or alternative embodiments, the graphical asset repository 112 stores reduced-resolution versions of source graphical assets 114. The graphical asset repository 112 can be implemented as one or more databases or one or more data servers.

These reduced-resolution versions are provided to the design application 124 as placement graphical assets 128. The placement graphical assets 128 are used in a content-creation workflow to develop layout assets within a document 127. For instance, a placement graphical asset 128, which is placed in a document 127, has the same dimensions as a corresponding source graphical asset 114 and a reduced resolution as compared to the corresponding source graphical asset 114. The content-creation workflow, which is performed using the design interface 126, uses the placement graphical asset 128 to develop a layout of creative content that includes the placement graphical asset 128. Subsequently, the finalized layout of creative content can allow the document to be exported using a full-resolution copy of the source graphical asset 114. (An example of this content-creation workflow is described herein with respect to FIG. 2.)

The registration module 116 is a module of the asset integration service 106 that enables registration of different content management services 104. For example, the design application 124 receives input via the client device 122 requesting registration with a given content management service 104. The design application 124 provides an authentication interface that solicits credentials for that content management service 104. The design application 124 receives the credentials via the authentication interface and provides these credentials to the registration module 116 via one or more function calls of the content management API 125. The registration module 116 provides these credentials to the desired content management service 104. If the content management service 104 verifies that the credentials are valid (i.e., authenticates the user), the registration module 116 adds the content management service 104 to a list of content management services that are available for use by the design application 124. This allows each content management service 104 to be discoverable within the design application 124 during a content-creation workflow, in which the design application 124 is used to generate, edit, or otherwise use creative content in a document 127.

The connection management module 118 is a module of the asset integration service 106 that maintains a list of connections to different servers. For instance, the connection management module 118 identifies which content management services 104 have authenticated a particular user of a design application 124. The connection management module 118 maintains connections to these content management services 104 for use by the design application 124. The connection management module 118 thus orchestrates connection authorization and reuse across multiple content management services 104.

Each of the content web server 101 and the creative apparatus 102 can be implemented using one or more servers, one or more processing devices, one or more platforms with corresponding application programming interfaces, cloud infrastructure, or the like. In addition, each module or service depicted in FIG. 1 can be implemented using one or more servers, one or more processing devices, one or more platforms with corresponding application programming interfaces, cloud infrastructure, or the like.

The client device 122 depicted in FIG. 1 can be implemented in any suitable manner. Examples of a client device include, but are not limited to, a personal computer, tablet computer, a desktop computer, a processing unit, any combination of these devices, or any other suitable device having one or more processors. Each client device includes at least one application supported by the creative apparatus 102. Client devices 102a-n correspond to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Figure 2:
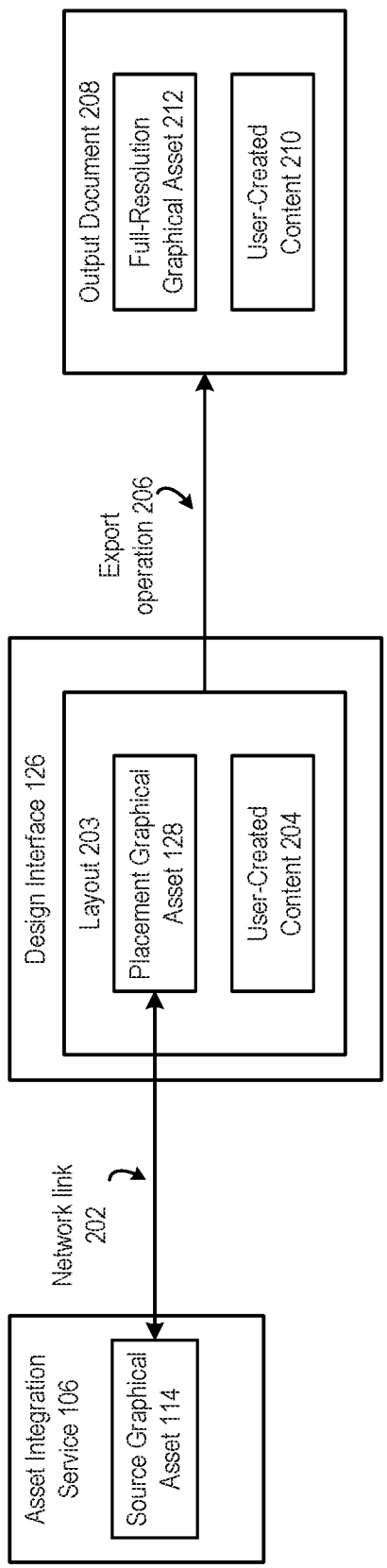
FIG. 2 depicts an example of a content creation workflow that involves integrating one or more source graphical assets available from one or more content management services into a layout along with user-created content, according to certain embodiments of this disclosure.

Examples of Integrating Remote Assets from Content Management Services with Creative Content Developed by Design Applications FIG. 2 depicts an example of a content creation workflow that involves integrating one or more source graphical assets 114 available from one or more content management services 104 into a layout 203 along with user-created content 204. In this workflow, the design application 124 accesses the asset integration service 106 to identify one or more source graphical assets 114 available from one or more content management service 104. The design application 124 presents, via the design interface 126, a panel or other interface element identifying a set of the source graphical assets 114 available for placement within the layout 203. If the design application 124 receives a user input that selects one of these assets, the design application 124 positions a placement graphical asset 128 within the layout 203 in accordance with the received user input.

In some embodiments, a network link 202 is created as part of this placement operation that positions placement graphical asset 128 within the layout 203. In some embodiments, the design application 124 creates the network link 202. In other embodiments, the asset state management module 110 creates the network link 202. The network link 202 identifies a network address at which a source graphical asset 114 can be retrieved. In some embodiments, this network address includes a path to a web page or other web-based stored hosted by a content management service 104 from which the source graphical asset 114 is accessible. In additional or alternative embodiments, this network address includes a path to the graphical asset repository 112.

In some embodiments, the design application 124 displays a placement graphical asset 128 with an adornment graphic. Examples of an adornment graphic include a particular border applied to the placement graphical asset 128, a graphic overlaid on a portion of the placement graphical asset 128, etc. The adornment graphic visually differentiates the placement graphical asset 128 from the corresponding source graphical asset 114. This visual differentiation indicates that the placement graphical asset 128 is not a full-resolution copy of the source graphical asset 114.

In some embodiments, using the placement graphical asset 128 reduces resources that would otherwise be required for downloading source graphical assets 114 to the client device 122 prior to a creative document 127 being finalized. For instance, some content management services 104 host terabytes of asset data, thereby reducing the ability of a client device 122 to store local copies of an entire asset repository. Additionally or alternatively, a given graphical asset can have a file size of multiple megabytes, which would increase the resources required (e.g., processing cycles, network bandwidth, memory requirements, etc.) for re-downloading a new version of a source graphical asset 114 that is updated before the creative document 127 is exported. By downloading and using the placement graphical asset 128, which is a reduced-resolution version of a corresponding source graphical asset 114, the layout 203 can be developed without adding a resource overhead (e.g., network bandwidth, memory usage, processing cycles, etc.) to a re-layout process.

In the workflow depicted in FIG. 2, the design application 124 generates an output document 208 via an export operation 206. In one example, the export operation 206 could involve creating a copy of the document 127 having a layout 203 in an output format (e.g., a PDF format, various image format, various video formats, etc.), and thereby generating an output document 208 in the output format. The export operation 206 is performed responsive to an export command or other user input received by the design application 124 via the design interface 126. The export operation 206 uses an on-demand download process. In the on-demand download process, the source graphical asset 114 is not required to be added to the document under development unless an export operation 206 is performed.

In some embodiments, the design application 124 responds to an export command by presenting an prompt, menu, or other interface element soliciting user input regarding the on-demand download. For instance, the prompt can indicate that the layout 203 includes one or more placement graphical assets 128. The prompt can ask a user if one or more of the corresponding source graphical assets 114 should be included in the output document 208. If the design application 124 receives an affirmative response with respect to one or more of the placement graphical assets 128, the design application 124 transmits a download command to the asset integration service 106 via the content management API 125. The asset state management module 110 executes the command by retrieving the corresponding source graphical assets 114 and transmitting the retrieved source graphical assets 114 to the design application 124.

In some embodiments, if the design application 124 is used to edit a document while having URL-based links opened on a client device 122 that lacks a full-resolution graphical asset 212 (i.e., a local, high-resolution copy of a source graphical asset 114), the full-resolution graphical asset 212 is not downloaded on the client device 122 unless required (e.g., for an export operation 206). This helps in enabling designers to share documents seamlessly without any performance impact. The placement graphical asset 128 is instead used in the document layout 203. For a final production workflow (i.e., an export operation 206) that requires a full-resolution graphical asset 212, the design application 124 executes on-demand download of the source graphical asset 114 to generate a local full-resolution graphical asset 212. As the user initiates the export operation 206 with document 127 having one or more network links 202, the design application 124 checks for the presence of the full-resolution graphical asset 212 in a local cache (i.e., a memory location that is local to the client device 122). If the asset is not found in the cache, the design application 124 automatically triggers an on-demand download of the source graphical asset 114, which is used to create an output document 208 having the full-resolution graphical asset 212.

In an export operation 206, the design application 124 provides a designer or other user with an opportunity to replace the placement graphical asset 128 with the corresponding source graphical asset 114 (e.g., for the cases where the high-resolution asset is required for production quality outputs). The opportunity can be provided via a right-click functionality in the asset status panel 602, a fly-out menu of the asset status panel 602, or both.

Replacing the placement graphical asset 128 with the corresponding source graphical asset 114 involves downloading the source graphical asset 114 and placing the source graphical asset 114 in the layout 203 during the export operation 206 (i.e., after a command initiating the export operation 206 is received and before the output document 208 is outputted by the design application 124). In some embodiments, these on-demand download operations increase the responsiveness of the design application 124 by reducing time that the design application 124 is unavailable to a user. To avoid the download process being time-consuming and resource-intensive, the download of a source graphical asset 114 can be performed asynchronously. The replacement of the placement graphical asset 128 with a full-resolution graphical asset 212 can be performed synchronously.

In some embodiments, a document 127 that is edited with the design application 124 is moved to a different client device 122 (e.g., by emailing the document 127 to another designer or otherwise sharing the document 127). If the document 127 includes URL-based network links or other network links 202, graphical assets are not downloaded to the different client device 122. Instead, placement graphical assets 128 are included in the document 127. This allows for sharing of documents without impacting network performance, tying up processing or storage capability on the client devices, etc. If one or more source graphical assets 114 are required by the different client device 122 when editing or exporting the document 127, an on-demand download is initiated by the different client device 122.

Figure 3:
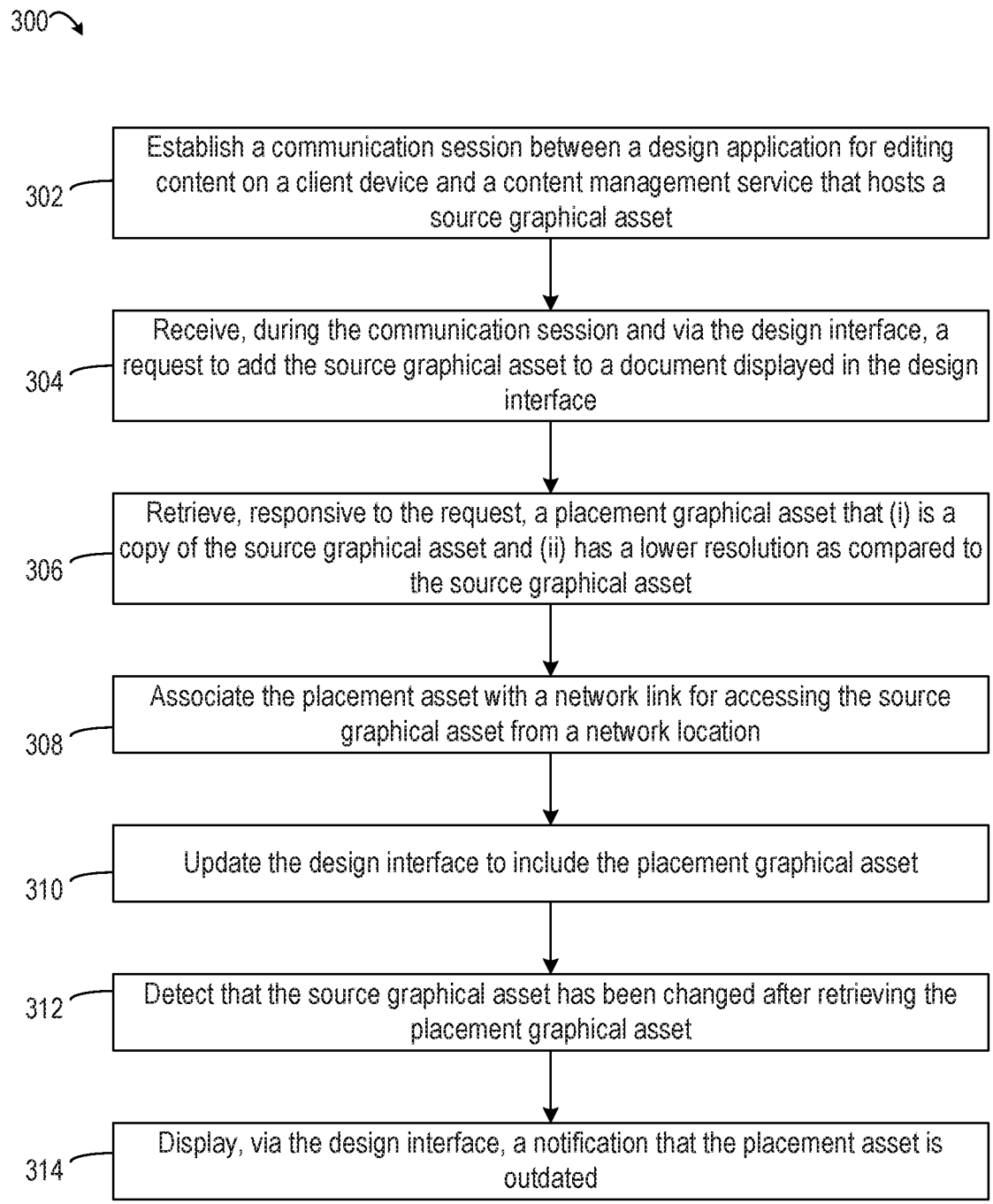
FIG. 3 depicts an example of a process for integrating remote assets available via a content management service with content developed by a design application, according to certain embodiments of this disclosure.

As indicated with respect to FIGS. 1 and 2, the asset integration service 106 uses placement graphical assets 128 to allow graphical assets from content management services to be integrated with design applications in a manner that uses computing resources (e.g., network bandwidth, processing cycles, storage capacity, etc.) more efficiently. For instance, FIG. 3 depicts an example of a process 300 for integrating remote assets available via a content management service 104 with content developed by a design application 124. For illustrative purposes, the process 300 is described with reference to certain examples depicted in the figures. In some embodiments, one or more processors of the creative apparatus 102, one or more client devices 122, or some combination thereof implement operations depicted in FIG. 3 by executing suitable program code. But other implementations are possible.

At block 302, the process 300 involves establishing a communication session between a design application 124 for editing content on a client device 122 and a content management service 104 that hosts a source graphical asset 114. In some embodiments, to implement block 302, one or more modules of the asset integration service 106 establishes one or more of these sessions using credentials obtained from the design application 124. To obtain these credentials, the design application 124 configures the client device 122 to display a suitable login interface. The design application 124 receives, via the login interface, one or more credentials (e.g., a username, a password, a one-time passcode, etc.) from a designer or other end user.

The design application 124 provides the credentials to the asset integration service 106. The asset integration service 106 transmits the credentials to a web server, such as the content web server 101, that executes one or more instances of the content management service 104. If the content management service 104 successfully authenticates the end user based on the credentials, the asset integration service 106 establishes a communication session between the design application 124 and the content management service 104. The communication session authorizes the client device 122 or a user of the client device 122 to use the design application 124 for accessing, via the asset integration service 106, graphical assets from the content management service 104.

Figure 4:
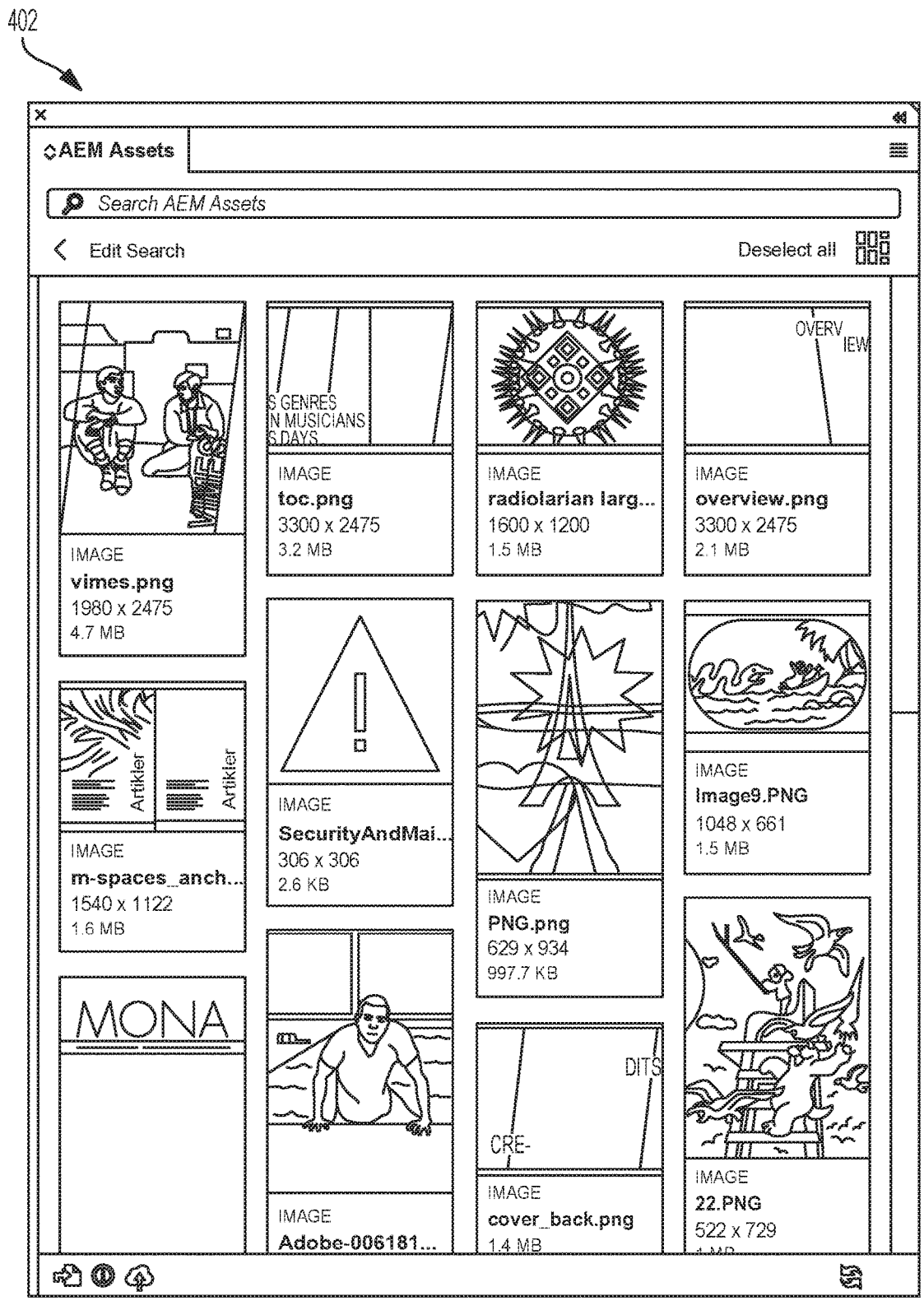
FIG. 4 depicts an example of a panel preview images for various graphical assets available from one or more content management services, according to certain embodiments of this disclosure.

For instance, the communication session allows the source graphical assets 114 to be browsed via a design interface 126. In some embodiments, the design application 124 presents, within the design interface 126, a panel of assets that provides a browser-like experience within the design application 124. FIG. 4 depicts an example of such a panel 402, which displays preview images for various assets available from one or more content management services 104.

To generate the panel 402, the design application 124 transmits, via the content management API 125, a function call to one or more suitable modules of the asset integration service 106 (e.g., the asset state management module 110). The function call includes a request for a listing of assets available from one or more content management services 104 with which the design application 124 is registered. The asset state management module 110 (or another suitable module of the asset integration service 106) communicates with the registration module 116 to identify one or more registered content management services 104. The asset state management module 110 (or another suitable module) causes the download management module 108 (or another suitable module) to obtain preview versions of a set of available assets from the registered content management services 104.

The download management module 108 also provides identifiers of network locations from which the source graphical assets 114, the corresponding placement graphical assets 128, or both can be downloaded. In some embodiments, an identifier indicates a location of a copy of a source graphical asset 114 as stored in the graphical asset repository 112. In other embodiments, an identifier indicates a web-based store, which is hosted by the content management service 104, from which the source graphical asset 114 is available. The asset state management module 110 generates the panel 402, which includes preview images of available graphical assets and their corresponding identifiers. The asset state management module 110 transmits the generated panel 402 to the design application 124 via the content management API 125.

At block 304, the process 300 involves receiving, during the communication session and via the design interface 126, a request to add the source graphical asset 114 to a document displayed in the design interface 126. To implement block 304, the design application 124 receives user input identifying one or more graphical assets to be added to a document. For instance, the design application 124 receives, via the panel 402, one or more selection inputs that select one or more graphical assets. The design application 124 also receives, via the panel 402, a movement input (e.g., a drag-and-drop input) that indicate a desire to place one or more selected graphical assets onto the layout 203 of the document 127.

At block 306, the process 300 involves retrieving, responsive to the request, a placement graphical asset 128 that (i) is a copy of the source graphical asset 114 and (ii) has a lower resolution as compared to the source graphical asset 114. To implement block 306, the design application 124 responds to the input received at block 304 by selecting an identifier associated with an asset indicated by the user input. The design application 124 also responds by generating a function call having a download command with the identifier as a parameter. The design application 124 provides, via the content management API 125, the function call with this download command to the asset state management module 110. The asset state management module 110 responds to the function call by causing the download management module 108 to generate or select the relevant placement graphical asset 128. The download management module 108 provides the placement graphical asset 128 to the asset state management module 110.

The asset state management module 110 transmits, using one or more function calls of the content management API 125, the placement graphical asset 128 to the design application 124.

At block 308, the process 300 involves associating the placement graphical asset 128 with a network link for accessing the source graphical asset 114 from a network location, such as the content management service 104 or the graphical asset repository 112. To implement block 308, the asset state management module 110 generates or selects a network link (e.g., the network link 202) that can be provided with the retrieved placement graphical asset 128. The asset state management module 110 associates the placement graphical asset 128 with the network link.

Figure 5:
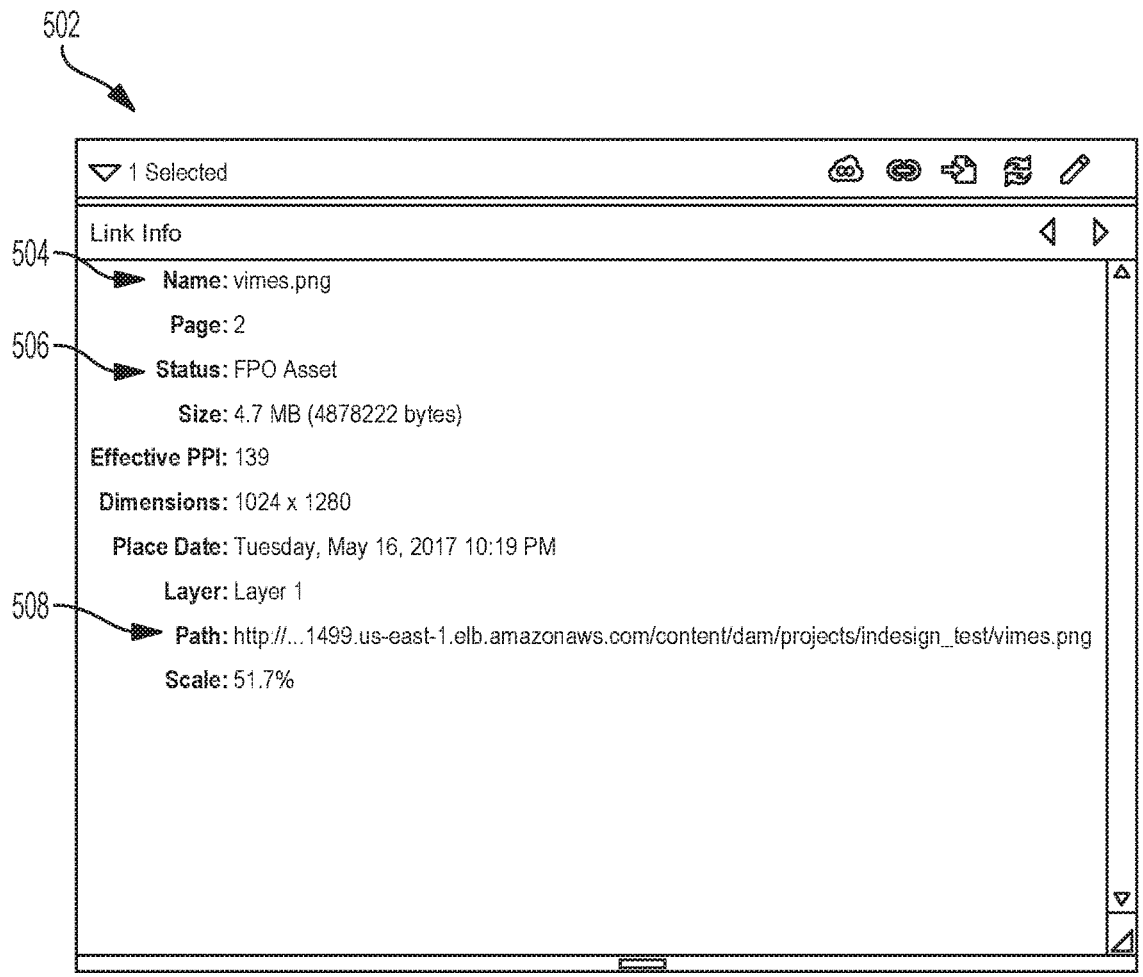
FIG. 5 depicts an example of an asset status panel for graphical assets used by a design application in one or more documents, according to certain embodiments of this disclosure.

In some embodiments, the design application 124 displays one or more panels or other interface elements that indicate information about the placement graphical asset 128, including the network link. For example, FIG. 5 depicts an example of an asset status panel 502. The asset status panel 502 includes a name 504 of the source graphical asset 114 that corresponds to the placement graphical asset 128. The asset status panel 502 also includes version information 506. The version information 506 indicates whether a particular asset in a layout 203 is a placement graphical asset 128 (e.g., "For Placement Only Asset" or "FPO Asset" in FIG. 5) or a full-resolution version of the source graphical asset 114. The asset status panel 502 also includes path information 508 included in the network link that is associated with the placement graphical asset 128. The path information 508 identifies a network location from which a full-resolution version of the source graphical asset 114 can be downloaded or otherwise accessed. Examples of the network location include a network share hosted by the content management service 104, a location in the graphical asset repository 112, etc.

At block 310, the process 300 involves updating the design interface 126 to include the placement graphical asset 128. To implement block 310, the design application 124 modifies the layout 203 to include the placement graphical asset 128. The design application 124 updates the design interface 126 to include the modified layout 203. The design application 124 provides the updated graphical interface to the client device 122.

In some embodiments, one or more modules of the asset integration service 106 apply an adornment graphic to the placement graphical asset 128. The adornment graphic indicates that the placement graphical asset 128 is a reduced-resolution version of the source graphical asset 114. The asset integration service 106 provides the placement graphical asset 128 and the applied adornment graphic to the design application 124. The design application 124 updates the design interface 126 to include the placement graphical asset 128 with the adornment graphic.

At block 312, the process 300 involves detecting that the source graphical asset 114 has been changed after retrieving the placement graphical asset 128. A change in the source graphical asset can include any operation that prevents the placement graphical asset 128 from corresponding to the source graphical asset 114. Examples of this change include modifications to the content of the source graphical asset 114, deletion of the source graphical asset 114, movement of the source graphical asset 114, etc.

To implement block 312, the asset state management module 110 polls the content management service 104 that hosts the source graphical asset 114. The polling occurs at regular interval during a creative workflow. The polling involves, for example, the asset state management module 110 generating one or more asset status requests. The asset state management module 110 provides these asset status requests to the download management module 108. The download management module 108 responds to these requests by communicating with the content management service 104 regarding changes to the source graphical asset 114, by checking for updates to a copy of the source graphical asset 114 in the graphical asset repository 112, or some combination thereof. If the asset 114 has been modified or deleted, the download management module 108 notifies the asset state management module 110.

At block 314, the process 300 involves displaying, via the design interface 126, a notification that the placement graphical asset 128 is outdated responsive to detecting that the source graphical asset 114 has been changed. To implement block 314, the design application 124 receives a responsive message from the asset integration service 106 (e.g., a message from the asset state management module 110). The responsive message indicates that the placement graphical asset 128 is outdated (e.g., out of date, missing, etc.) due to a modification or deletion of the source graphical asset 114. The design application 124 generates, responsive to receiving this message, a notification that the placement graphical asset 128 is modified, missing, or otherwise outdated. An example of the notification is a modification to an adornment graphic on the placement graphical asset 128 indicating that the source graphical asset 114 has been modified, deleted, etc.

In some embodiments, the notification generated at block 314 can cause a user of the design application 124 to request an updated placement graphical asset 128. For instance, the design application could receive, via the design interface 126, a command or other user input indicating a desire to update the placement graphical asset that has become outdated. The design application 124 responds to this command by transmitting, via the content management API 125, a function call to the asset state management module 110 that requests a new version of the placement graphical asset 128. Responsive to this function call, the asset state management module 110 causes the download management module 108 to obtain an updated placement graphical asset that is a copy of the source graphical asset as changed and that has a lower resolution as compared to the source graphical asset as changed. In some embodiments, the download management module 108 generates a new placement graphical asset 128 from a current version of the source graphical asset 114. In additional or alternative embodiments, the download management module 108 retrieves a modified placement graphical asset 128 that corresponds to a current version of the source graphical asset 114. The design interface 126 is modified to include the updated placement graphical asset 128, in a manner similar to that described above with respect to block 310.

The operations described above with respect to FIG. 3 enable on-demand downloads of source graphical assets. In one example, the design application 124 receives via the design interface 126, a command to download the source graphical asset 114. The design application 124 provides the command (or a function call generated from the command) to the asset integration service 106. The asset state management module 110 identifies, from the network link 202, a network location at which the source graphical asset is accessible (e.g., the content management service 104, the graphical asset repository 112, etc.). The asset state management module 110 downloads the source graphical asset from the network location and provides the source graphical asset to the design application 124. The design application 124 updates the document 127 to include the source graphical asset (e.g., by adding the source graphical asset to the layout 203). In some embodiments, these on-demand download operations are performed as part of an export operation. In additional or alternative embodiments, these on-demand download operations are performed prior to an export operation (e.g., as part of the creative workflow preceding an export operation).

Figure 6:
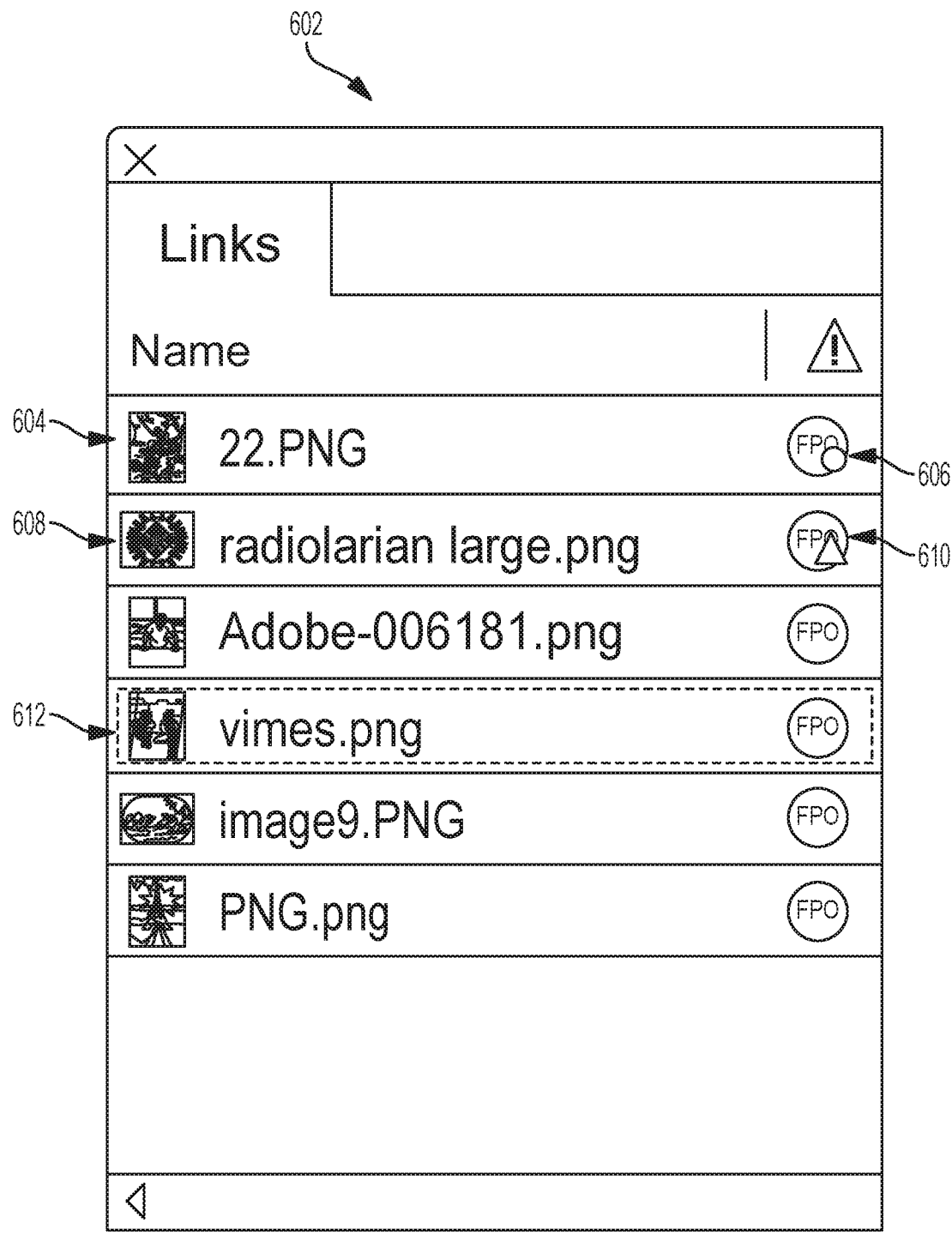
FIG. 6 depicts an example of an updated asset status panel having one or more indicators that a placement graphical asset is outdated, according to certain embodiments of this disclosure.

FIG. 6 depicts an example of an updated asset status panel 602 having one or more indicators that a placement graphical asset is outdated. For instance, the icon 604 for a particular placement graphical asset includes an indicator graphic 606 (e.g., a circle) indicating that a particular source graphical asset 114 has been deleted or is no longer available. The icon 608 for another placement graphical asset includes an indicator graphic 610 (e.g., a triangle) indicating that a corresponding source graphical asset 114 has been modified. By contrast, the icon 612 for a third placement graphical asset lacks an indicator graphic, thereby indicating that the corresponding source graphical asset 114 matches the placement graphical asset.

Figure 7:
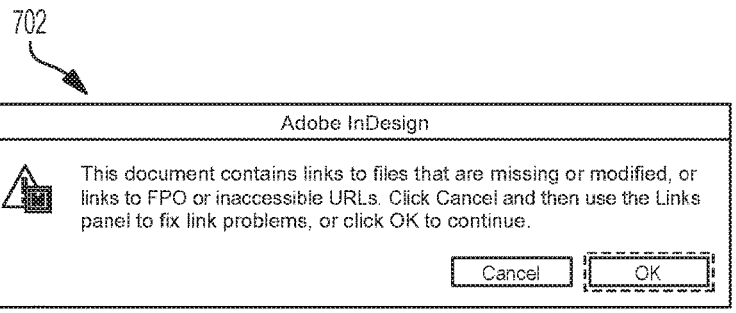
FIG. 7 depicts an example of a warning indicating that a document includes placement graphical assets rather than full-resolution source graphical assets, according to certain embodiments of this disclosure.

As discussed above with respect to FIG. 2, content that is created via the design application 124 is meant to be exported to different file formats (e.g., print formats digital formats, etc.) for consumption by end users. An output document 208 is generated with high-quality assets, such as a full-resolution graphical asset 212, so that the content-consumption experience of users is not compromised. If one or more of the source graphical assets 114 have been modified or are unavailable, as indicated by the indicator graphics 606 and 610, the design application 124 can present, prior to an export operation being completed, a warning that notifies users that low-resolution assets (e.g., placement graphical assets 128) are included in a document 127. An example of such a warning 702 is depicted in FIG. 7.

Figure 8:
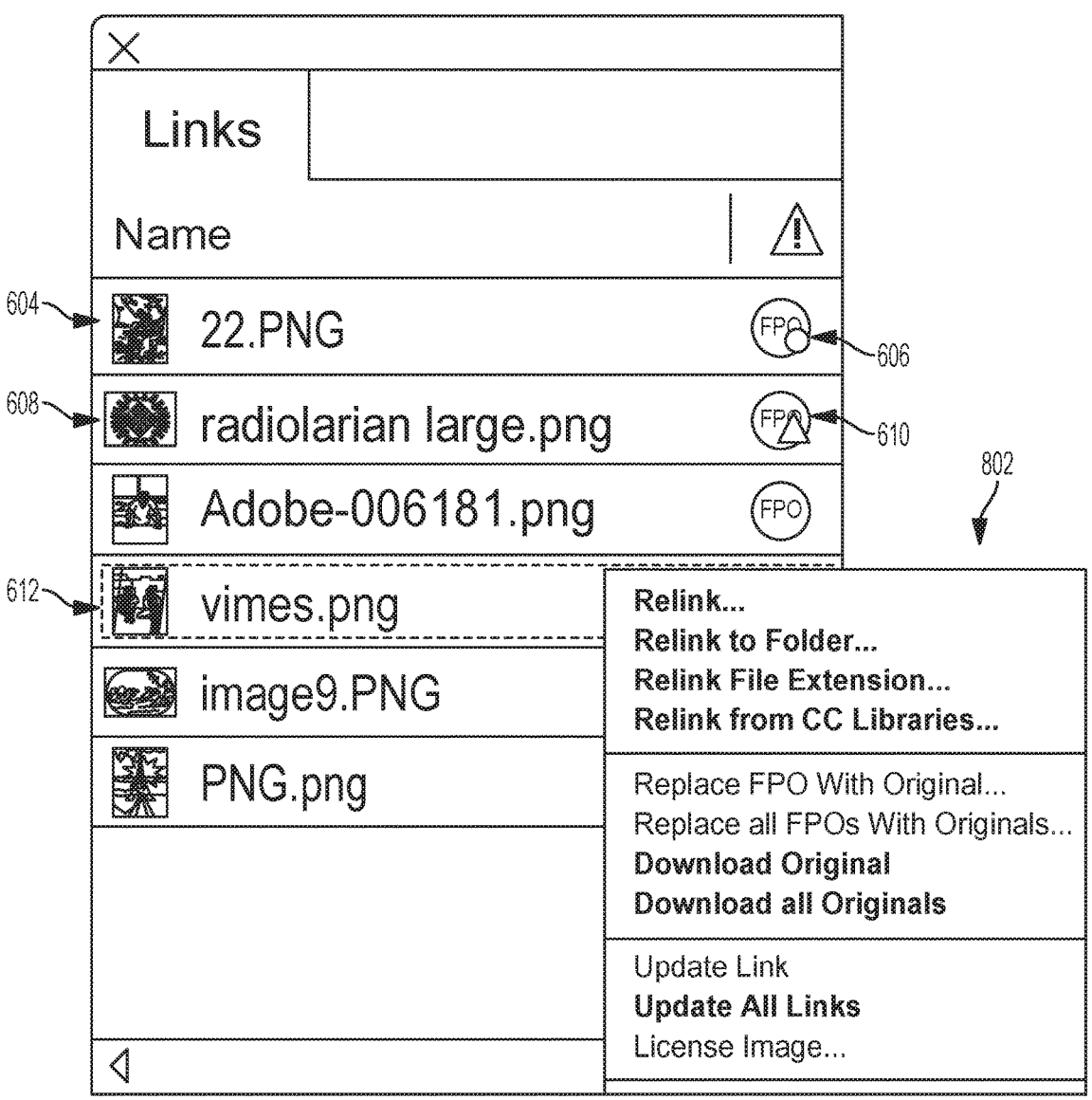
FIG. 8 depicts an example of a menu for downloading source graphical assets into a document that includes placement graphical assets, according to certain embodiments of this disclosure.

The design application 124 can perform on-demand downloads for a single asset or multiple assets. For example, FIG. 8 depicts an example of the asset status panel 602 with a contextual menu 802 for downloading source graphical assets 114 into a document 127. The design application 124 can receive a user input, such as a right-click on the icon 612, that causes a contextual menu 802 to be displayed.

The contextual menu 802 presents an option for downloading a single source graphical asset 114 that corresponds to the icon 612 that received the input. The contextual menu 802 also presents an option for downloading source graphical assets 114 for all of the placement graphical assets 128 indicated by the icons in the asset status panel 602. If the design application 124 receives a selection of one of these options, the design application 124 transmits, via the content management API 125 and to the asset state management module 110, a retrieve command with an identifier of a single source graphical asset 114 (if the single-asset option is selected) or identifiers of a set of source graphical assets 114 (if the multiple-asset option is selected). The design application 124 obtains the asset identifier or set of identifiers from one or more network links that associate the relevant placement graphical assets 128 with the corresponding source graphical assets 114.

The asset state management module 110 responds to this retrieve command by causing the download management module 108 to retrieve the source graphical asset 114 or set of source graphical assets 114. The download management module 108 retrieves the source graphical asset 114 or a set of source graphical assets 114 from the graphical asset repository 112 or from the content management service 104 hosting the source graphical asset 114. The download management module 108 provides the retrieved source graphical asset 114 or set of source graphical assets 114 to the asset state management module 110.

The asset state management module 110 transmits or otherwise provides, via the content management API 125, the retrieved source graphical asset 114 or set of source graphical assets 114 to the design application 124. The design application 124 modifies the layout 203 to replace the placement graphical asset 128 (or set of placement graphical assets 128) with the retrieved source graphical asset 114 (or set of source graphical assets 114). The design application 124 transmits, via a data network, the modified layout 203 and the retrieved source graphical asset 114 or set of source graphical assets 114 to the client device 122.

Example of a Computing System for Integrating Assets from Content Management Services with Creative Workflows of Design Applications Any suitable computing system or group of computing systems can be used for performing the operations described herein. For example, FIG. 9 depicts an example of a computing system 900 that executes an asset integration service 106, which can include one or more of the modules depicted in FIG. 1. In some embodiments, the computing system 900 also executes the design application 124, as depicted in FIG. 9. In other embodiments, a separate computing system having devices similar to those depicted in FIG. 9 (e.g., a processor, a memory, etc.) executes the design application 124 separately from the asset integration service 106.

The depicted example of a computing system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, such as input or output devices. For example, the computing system 900 is shown with one or more input/output ("I/O") interfaces 908. An I/O interface 908 can receive input from input devices or provide output to output devices. One or more buses 906 are also included in the computing system 900. The bus 906 communicatively couples one or more components of a respective one of the computing system 900.

The computing system 900 executes program code that configures the processor 902 to perform one or more of the operations described herein. The program code includes, for example, the asset integration service 106 or other suitable applications that perform one or more operations described herein. The program code may be resident in the memory device 904 or any suitable computer-readable medium and may be executed by the processor 902 or any other suitable processor. In some embodiments, both the asset integration service 106 and the design application 124 are stored in the memory device 904, as depicted in FIG. 9. In additional or alternative embodiments, the asset integration service 106 and the design application 124 are stored in different memory devices of different computing systems. In additional or alternative embodiments, the program code described above is stored in one or more other memory devices accessible via a data network.

The computing system 900 also includes a network interface device 910. The network interface device 910 includes any device or group of devices suitable for establishing a wired or wireless data connection to one or more data networks 911, by which the computing system 900 can communicate with client devices 122 and content web servers 101. Non-limiting examples of the network interface device 910 include an Ethernet network adapter, a modem, or the like. The computing system 900 is able to communicate with one or more other computing devices (e.g., a computing device executing an asset integration service 106) via a data network using the network interface device 910.

In some embodiments, the computing system 900 also includes the presentation device 912 depicted in FIG. 9. A presentation device 912 can include any device or group of devices suitable for providing visual, auditory, or other suitable sensory output. Non-limiting examples of the presentation device 912 include a touchscreen, a monitor, a speaker, a separate mobile computing device, etc. In some embodiments, the presentation device 912 can include a remote client-computing device that communicates with the computing system 900 using one or more data networks described herein. Other embodiments can omit the presentation device 912.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, or additions to the present subject matter as would be readily apparent to one of ordinary skill in the art.

The invention claimed is:

1. A method for integrating remote assets available via a content management service with content developed by a design application, the method comprising:
    establishing a communication session between the design application and a client device for accessing graphical assets from a content web server that executes the content management service, wherein a source graphical asset is accessible from the content management service via a data network;
    receiving, during the communication session and via a design interface provided by the design application, a request to add the source graphical asset to a document displayed in the design interface and on the client device;
    retrieving, responsive to the request, a placement graphical asset, the placement graphical asset (i) is a copy of the source graphical asset and (ii) has a lower resolution as compared to the source graphical asset;
    updating the design interface to include the placement graphical asset;
    associating the placement graphical asset with a network link for accessing the source graphical asset via the content management service;
    detecting that the source graphical asset has been changed after retrieving the placement graphical asset; and
    displaying, via the design interface and responsive to said detecting, a notification that the placement graphical asset is outdated.

2. The method of claim 1, further comprising:
    receiving, via the design interface, a command to update the placement graphical asset that is outdated;
    retrieving, responsive to the command, an updated placement graphical asset that (i) is a copy of the source graphical asset as changed and (ii) has a lower resolution as compared to the source graphical asset as changed; and modifying the design interface to include the updated placement graphical asset.

3. The method of claim 1, further comprising:
receiving, via the design interface, a command to download the source graphical asset;
identifying, from the network link, a network location at which the source graphical asset is accessible;
downloading the source graphical asset from the network location; and
updating the document to include the source graphical asset.

4. The method of claim 1, further comprising:
receiving, via the design interface, a command to export the document to an output format;
retrieving the source graphical asset from the content management service; and
exporting the document with the source graphical asset and in the output format.

5. The method of claim 4, wherein retrieving the source graphical asset comprises:
identifying, from the network link, a network location hosted by the content management service at which the source graphical asset is accessible;
downloading the source graphical asset from the network location.

6. The method of claim 1, wherein updating the design interface to include the placement graphical asset comprises:
applying an adornment graphic to the placement graphical asset indicating that the placement graphical asset is a reduced-resolution version of the source graphical asset; and
modifying the design interface to include the placement graphical asset with the adornment graphic.

7. The method of claim 1, wherein displaying the notification via the design interface comprises causing the design application to update the design interface to include the notification.

8. A system comprising:
a processing device; and
a non-transitory computer-readable medium communicatively coupled to the processing device, wherein the processing device is configured to execute an asset integration service stored in the non-transitory computer-readable medium and thereby perform operations for integrating remote assets available via a content management service with content developed by a design application, the operations comprising:
establishing a communication session between the design application and a client device for accessing graphical assets from a content web server that executes the content management service;
receiving, during the communication session, a request to add a source graphical asset to a document displayed on the client device and in a design interface provided by the design application,
causing the design application to update the design interface to include a placement graphical asset that (i) is a copy of the source graphical asset and (ii) has a lower resolution as compared to the source graphical asset, and
modifying, subsequent to a change in the source graphical asset, the design interface to include an updated placement graphical asset that (i) is a copy of the source graphical asset as changed and (ii) has a lower resolution as compared to the source graphical asset as changed.

9. The system of claim 8, the operations further comprising, prior to modifying the design interface:
detecting that the source graphical asset has been changed;
providing a notification, displayable via the design interface, that the placement graphical asset is outdated;
receiving, via the design interface, a command to update the placement graphical asset that is outdated; and
retrieving, responsive to the command, the updated placement graphical asset.

10. The system of claim 8, the operations further comprising:
associating the placement graphical asset with a network link for accessing the source graphical asset via the content management service,
receiving, via the design interface, a command to download the source graphical asset;
identifying, from the network link, a network location at which the source graphical asset is accessible;
downloading the source graphical asset from the network location; and
updating the document to include the source graphical asset.

11. The system of claim 8, the operations further comprising:
receiving, via the design interface, a command to export the document to an output format;
retrieving the source graphical asset from the content management service; and
exporting the document with the source graphical asset and in the output format.

12. The system of claim 11, wherein retrieving the source graphical asset comprises:
associating the placement graphical asset with a network link for accessing the source graphical asset via the content management service,
identifying, from the network link, a network location hosted by the content management service at which the source graphical asset is accessible;
downloading the source graphical asset from the network location.

13. The system of claim 8, wherein updating the design interface to include the placement graphical asset comprises:
applying an adornment graphic to the placement graphical asset distinguishing the placement graphical asset from the source graphical asset; and
modifying the design interface to include the placement graphical asset with the adornment graphic.

14. The system of claim 8, wherein the asset integration service comprises an application programming interface configured for receiving commands from the design application and providing function calls derived from the commands to the content management service.

15. A non-transitory computer-readable medium having program code of an asset integration service that is stored thereon, the program code executable by one or more processing devices for performing operations for integrating remote assets available via a content management service with content developed by a design application, the operations comprising:
establishing a communication session between the design application and a client device for accessing graphical assets from a content web server that executes the content management service, wherein a source graphical asset is accessible from the content management service via a data network;

receiving, during the communication session and via a design interface provided by the design application, a request to add the source graphical asset to a document displayed in the design interface and on the client device;

a step for retrieving, responsive to the request, a placement graphical asset that (i) is a copy of the source graphical asset and (ii) has a lower resolution as compared to the source graphical asset;

updating the design interface to include the placement graphical asset;

a step for detecting that the source graphical asset has been changed after retrieving the placement graphical asset; and causing the design interface to displaying a notification that the placement graphical asset is outdated.

16. The non-transitory computer-readable medium of claim 15, the operations further comprising:

receiving, via the design interface, a command to update the placement graphical asset that is outdated;

retrieving, responsive to the command, an updated placement graphical asset that (i) is a copy of the source graphical asset as changed and (ii) has a lower resolution as compared to the source graphical asset as changed; and modifying the design interface to include the updated placement graphical asset.

17. The non-transitory computer-readable medium of claim 15, the operations further comprising:

receiving, via the design interface, a command to download the source graphical asset;

identifying, from a network link associating the source graphical asset and placement graphical asset, a network location at which the source graphical asset is accessible;

downloading the source graphical asset from the network location; and updating the document to include the source graphical asset.

18. The non-transitory computer-readable medium of claim 15, the operations further comprising:

receiving, via the design interface, a command to export the document to an output format;

retrieving the source graphical asset from the content management service; and exporting the document with the source graphical asset and in the output format.

19. The non-transitory computer-readable medium of claim 18, wherein retrieving the source graphical asset comprises:

identifying, from a network link associating the source graphical asset and placement graphical asset, a network location hosted by the content management service at which the source graphical asset is accessible;

downloading the source graphical asset from the network location.

20. The non-transitory computer-readable medium of claim 15, wherein the asset integration service comprises an application programming interface having program code for receiving commands from the design application and providing function calls derived from the commands to the content management service.

* * * * *